US008643639B2

(12) United States Patent
Sah

(10) Patent No.: US 8,643,639 B2
(45) Date of Patent: Feb. 4, 2014

(54) NON-VOLATILE DISPLAY MODULE AND NON-VOLATILE DISPLAY APPARATUS

(75) Inventor: Wen-Jyh Sah, Tainan (TW)

(73) Assignee: Pervasive Display Co., Ltd., Tainan (TW)

( * ) Notice: Subject to any disclaimer, the term of this patent is extended or adjusted under 35 U.S.C. 154(b) by 378 days.

(21) Appl. No.: 12/725,354

(22) Filed: Mar. 16, 2010

(65) Prior Publication Data

US 2010/0238148 A1 Sep. 23, 2010

(30) Foreign Application Priority Data

Mar. 18, 2009 (TW) .............................. 98108777 A

(51) Int. Cl.
*G06F 3/038* (2013.01)

(52) U.S. Cl.
USPC .............................. 345/214; 345/211; 345/87

(58) Field of Classification Search
USPC ........... 345/204, 206, 213, 87–111, 211, 214; 349/40–50
See application file for complete search history.

(56) References Cited

U.S. PATENT DOCUMENTS

| | | | | |
|---|---|---|---|---|
| 6,396,468 | B2 * | 5/2002 | Matsushima et al. | 345/87 |
| 6,542,139 | B1 * | 4/2003 | Kanno | 345/87 |
| 2004/0095340 | A1 * | 5/2004 | Nakamura | 345/204 |
| 2004/0257388 | A1 * | 12/2004 | Tobita | 345/690 |
| 2006/0071892 | A1 * | 4/2006 | Sakaguchi | 345/89 |
| 2008/0150859 | A1 * | 6/2008 | Song et al. | 345/87 |
| 2008/0198126 | A1 * | 8/2008 | Yamashita | 345/99 |

FOREIGN PATENT DOCUMENTS

| | | | |
|---|---|---|---|
| CN | 1573901 | A | 2/2005 |
| JP | 2-253293 | A | 10/1990 |
| JP | 3-296713 | A | 12/1991 |
| JP | 4-218023 | A | 8/1992 |
| JP | 11-326872 | A | 11/1999 |
| JP | 2001-519921 | A | 10/2001 |
| JP | 2003-108021 | A | 4/2003 |
| JP | 2005-509925 | A | 4/2005 |
| JP | 2006-30964 | A | 2/2006 |
| JP | 2008-249895 | A | 10/2008 |

* cited by examiner

*Primary Examiner* — Pegeman Karimi
(74) *Attorney, Agent, or Firm* — Cheng-Ju Chiang

(57) ABSTRACT

A non-volatile display module has a display panel and a driving circuit. The display panel has a substrate at which at least one scan line, at least one data line and at least one thin film transistor (TFT) are disposed. The TFT is located at an intersection area of the scan line and data line. The driving circuit has a driving unit, a power converting unit and a multiplexing unit. The driving unit receives at least one image controlling signal according to a clock signal. The power converting unit generates a plurality of power signals. The multiplexing unit is electrically connected with the scan line, the data line, the driving unit and the power converting unit, and outputs one of the power signals to the scan line or the data line according to the image controlling signal. A non-volatile display apparatus is also disclosed.

14 Claims, 5 Drawing Sheets

NON-VOLATILE DISPLAY MODULE AND NON-VOLATILE DISPLAY APPARATUS

CROSS REFERENCE TO RELATED APPLICATIONS

This Non-provisional application claims foreign priority under 35 U.S.C. §119(a) on Taiwan Patent Application No(s). 098108777 filed in Taiwan, Republic of China on Mar. 18, 2009, the entire contents of which are hereby incorporated by reference. In addition, Chinese Patent Application No. 200910129135.7, filed on Mar. 27, 2009 in China, and Japanese Patent Application No. 2010-025662, filed on Feb. 8, 2010 in Japan, are also hereby incorporated by reference.

BACKGROUND OF THE INVENTION

1. Field of Invention

The invention relates to a display module and a display apparatus and, in particular, to a non-volatile display module and a non-volatile display apparatus.

2. Related Art

Display apparatuses, developed from earlier cathode ray tubes (CRT) display apparatuses to present liquid crystal display (LCD) apparatuses, organic light emitting diode (OLED) display apparatuses and E-Paper display apparatuses, have been gradually reduced in volume and weight and widely applied to communication, information and consumer electronic products.

As shown in FIG. 1, a conventional display apparatus, such as an LCD apparatus, includes an LCD module 1 which has an LCD panel 11, a data driving circuit 12 and a scan driving circuit 13. The data driving circuit 12 is electrically with the LCD panel 11 by a plurality of data lines $D_{11}$ to $D_{1n}$, and the scan driving circuit 13 is electrically connected with the LCD panel 11 by a plurality of scan lines $S_{11}$ to $S_{1m}$.

As shown in FIG. 2, the data driving circuit 12 includes a shift register 122, a first latch 123, a second latch 124 and a level shifter 125. The shift register 122 is electrically connected with the first latch 123, and the second latch 124 is electrically connected with the first latch 123 and the level shifter 125.

In conjunction with FIG. 3, the shift register 122 generates a plurality of shift register signals $A_{11}$ to $A_{1n}$ according to a start pulse signal $A_{01}$ and a clock signal CK and transmits the shift register signals $A_{11}$ to $A_{1n}$ to the first latch 123.

The first latch 123 receives an image signal $A_{02}$, which is stored in the first latch 123 and includes a plurality of image data, according to the shift register signals $A_{11}$ to $A_{1n}$, Then, the second latch 124 catches the image signal $A_{02}$ from the fist latch 123 according to a latch enabling signal $A_{03}$. The level shifter 125 converts the image signal $A_{02}$ stored in the second latch 124 to a plurality of display signals that are transmitted to the LCD panel 11 by the data lines $D_{11}$ to $D_{1n}$, for displaying images.

With the progress of technologies, non-volatile materials, such as electrophoretic material, electro-wetting material, cholesterol liquid crystal and nematic liquid crystal, are applied to display apparatuses nowadays. The display apparatus using non-volatile materials is smaller in size and capable of portability, so if the data driving circuit 12 and the scan driving circuit 13 can be integrated in the display apparatus so as to decrease the number of components, the display apparatus can save more room or can be lighter and thinner to further save production cost.

Therefore, it is an important subject to provide a non-volatile display module and a non-volatile display apparatus that can decrease the number of driving components.

SUMMARY OF THE INVENTION

In view of the foregoing subject, an object of the invention is to provide a non-volatile display module and a non-volatile display apparatus that can decrease the number of driving components.

To achieve the above object, the invention discloses a non-volatile display module which includes a display panel and a driving circuit. The display panel has a substrate at which at least one scan line, at least one data line and at least one thin film transistor (TFT) are disposed. The TFT is located at an intersection area of the scan line and data line. The driving circuit has a driving unit, a power converting unit and a multiplexing unit. The driving unit receives at least one image controlling signal according to a clock signal. The power converting unit generates a plurality of power signals. The multiplexing unit is electrically connected with the scan line, the data line, the driving unit and the power converting unit, and outputs one of the power signals to the scan line or the data line according to the image controlling signal.

To achieve the above object, the invention discloses a non-volatile display apparatus which includes a non-volatile display module. The non-volatile display module includes a display panel and a driving circuit. The driving circuit has a driving unit, a power converting unit and a multiplexing unit. The driving unit receives at least one image controlling signal according to a clock signal. The power converting unit generates a plurality of power signals. The multiplexing unit is electrically connected with the scan line, the data line, the driving unit and the power converting unit, and outputs one of the power signals to the scan line or the data line according to the image controlling signal.

As mentioned above, the driving circuit of the non-volatile display module and apparatus of the invention has the driving unit, the power converting unit and the multiplexing unit, which can process the signals transmitted by the scan line and the data line to display images. Compared with the prior art, the invention integrates the scan driving circuit and the data driving circuit into the driving circuit that is configured with a simpler frame and used to process the signals transmitted by the scan line and the data line simultaneously. Therefore, the non-volatile display module and apparatus of the invention can decrease the number of driving components to save more room and save the production cost.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

First Embodiment

The non-volatile display apparatus means the display apparatus has at least two stable states and can hold the stable state for at least several tens of microseconds after the power is turned off. Besides, the optical modulation material can include electrophoretic material, electro-wetting material, cholesterol liquid crystal or nematic liquid crystal.

Figure 1:
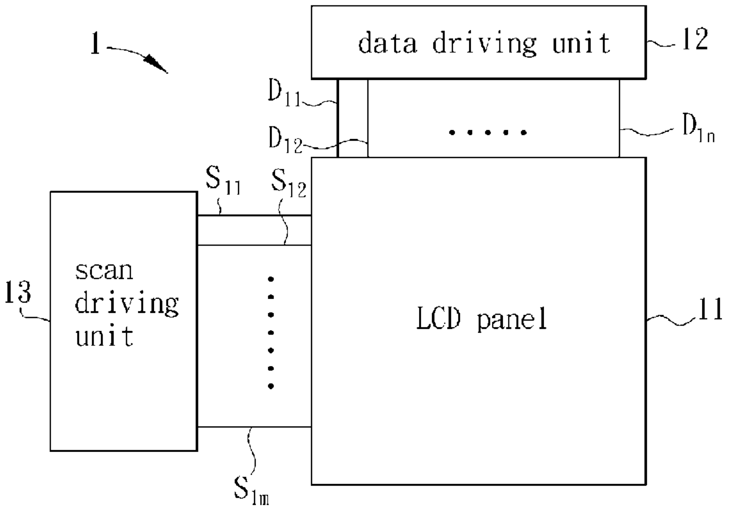
FIG. 1 (PRIOR ART)
FIG. 1 is a block diagram of a conventional display apparatus.
Figure 2:
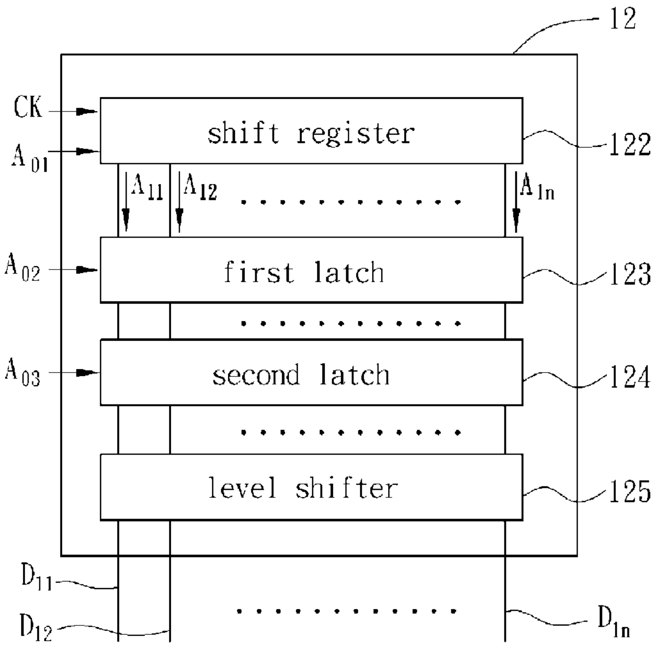
FIG. 2 (PRIOR ART)
FIG. 2 is a block diagram of a conventional data driving circuit.
Figure 3:
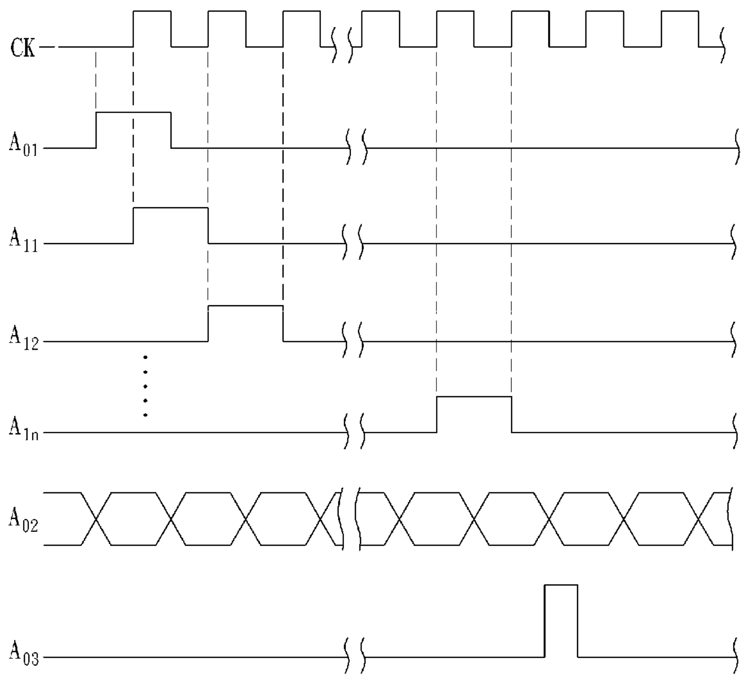
FIG. 3 (PRIOR ART)
FIG. 3 is a schematic diagram of controlling signals used by the data driving circuit of a conventional display apparatus.
Figure 4:
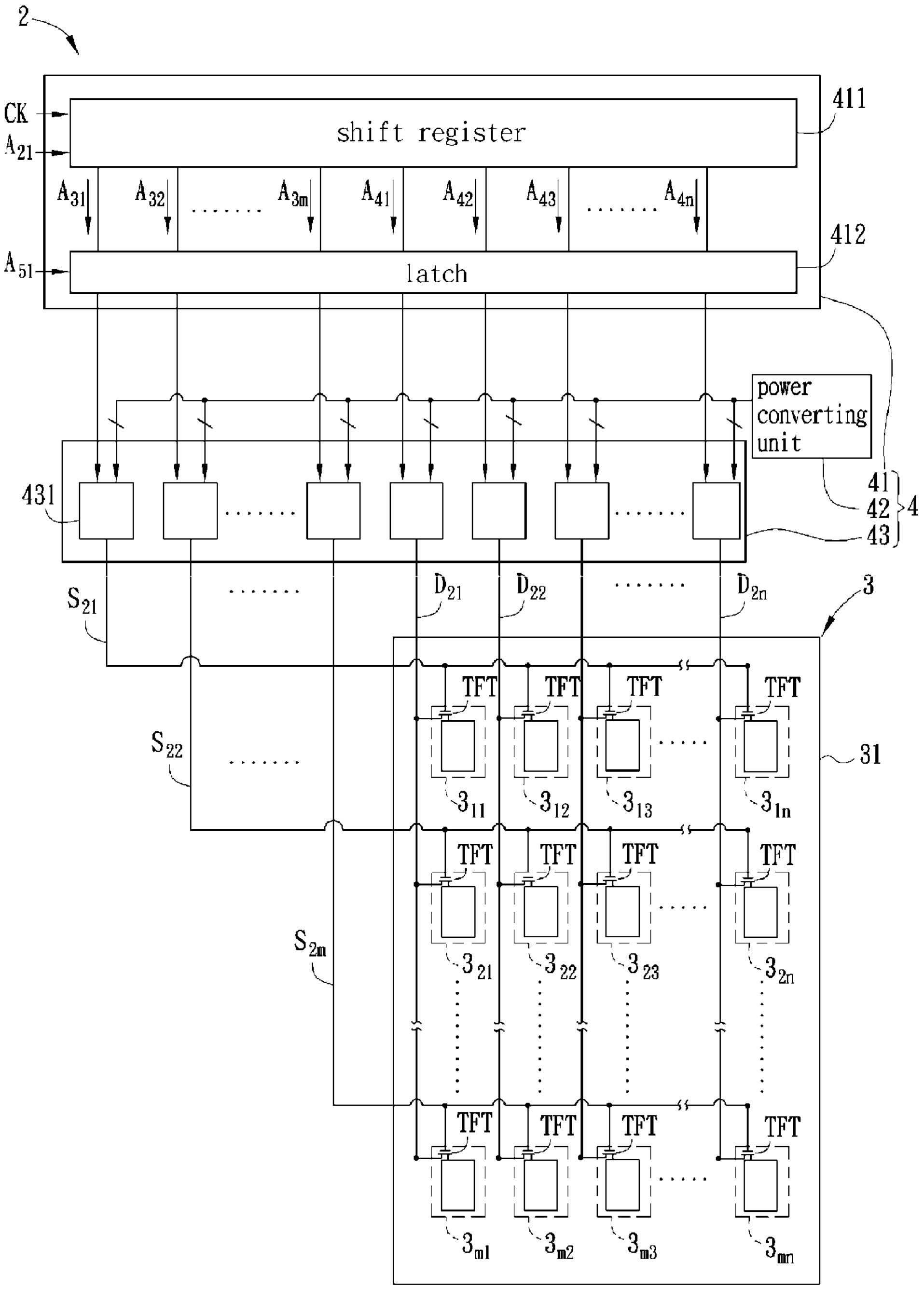
FIG. 4 is a schematic diagram of a non-volatile display apparatus according to a preferred embodiment of the invention.

As shown in FIG. 4, the non-volatile display apparatus according to a preferred embodiment of the invention includes a non-volatile display module 2 which has a display panel 3 and a driving circuit 4. The driving circuit 4 is electrically connected with the display panel 3 by a plurality of scan lines $S_{21}$ to $S_{2m}$ and a plurality of data lines $D_{21}$ to $D_{2n}$.

The display panel 3 has a substrate 31, at least one scan line, at least one data line and at least one thin film transistor TFT. The thin film transistor TFT is disposed at an intersection area of the data line and the scan line, and electrically connected with an electrode. In the embodiment, the intersection area and the thin film transistor TFT are defined as a pixel unit. The pixel units can be disposed as one-dimension array or two-dimension array. The display panel 3 of the embodiment includes a plurality of pixel units $\mathbf{3}_{11}$ to $\mathbf{3}_{mn}$ as an illustrative example. The scan lines $S_{21}$ to $S_{2m}$ and the data lines $D_{21}$ to $D_{2n}$ are intersected and form a plurality of intersection areas, and the pixel units $\mathbf{3}_{11}$ to $\mathbf{3}_{mn}$ are disposed at the intersection areas respectively.

Driving circuit 4 includes a driving unit 41, a power converting unit 42 and a multiplexing unit 43. The multiplexing unit 43 is electrically connected with the scan lines $S_{21}$ to $S_{2m}$, the data lines $D_{21}$ to $D_{2n}$, the power converting unit 42 and the driving unit 41.

The driving unit 41 has a shift register 411 and a latch 412 electrically connected to each other. The multiplexing unit 43 has at least one multiplexer, and the multiplexing unit 43 of the embodiment has a plurality of multiplexer 431 which are electrically connected with the driving unit 41, the power converting unit 42, the scan lines $S_{21}$ to $S_{2m}$ and the data lines $D_{21}$ to $D_{2n}$ respectively.

When the driving circuit 4 is driven, the shift register 411 receives an image controlling signal $A_{21}$ according to a clock signal CK. The image controlling signal $A_{21}$ includes a plurality of first driving signals $A_{31}$ to $A_{3m}$ and a plurality of second driving signals $A_{41}$ to $A_{4n}$.

The latch 412 catches the first driving signals $A_{31}$ to $A_{3m}$ and the second driving signals $A_{41}$ to $A_{4n}$ according to a latch signal $A_{51}$ and transmits the first driving signals $A_{31}$ to $A_{3m}$ and the second driving signals $A_{41}$ to $A_{4n}$ to the multiplexing unit 43. In the embodiment, the shift register 411 receives the image controlling signal $A_{21}$ in a serial way, and the latch 412 transmits the first driving signals $A_{31}$ to $A_{3m}$ and the second driving signals $A_{41}$ to $A_{4n}$ to the multiplexing unit 43 in a parallel way.

For clear description, the power converting unit 42, the multiplexer 431 and the corresponding scan line $S_{21}$ that is electrically connected with the power converting unit 42 and the multiplexer 431 are illustrated as an example to explain the multiplexing unit 43 can transmit one of the power signal to the scan line $S_{21}$ according to the image controlling signal $A_{21}$.

Figure 5:
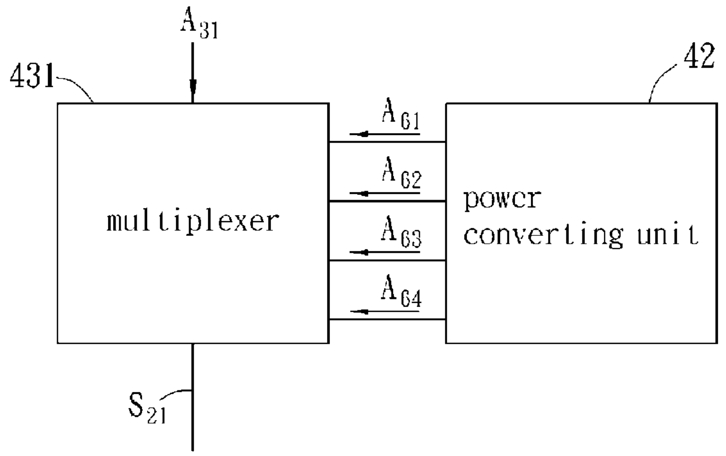
FIGS. 5 to 7 are schematic diagrams of the multiplexer and the power converting unit electrically connected with each other of the display apparatus shown in FIG. 4.

As shown in FIG. 5, the power converting unit 42 can output four power signals $A_{61}$ to $A_{64}$ to the multiplexer 431. The power converting unit 42 can be, for example, a DC/DC converting unit, and the power signals $A_{61}$ to $A_{64}$ can be DC voltage signals, such as 30V, −10V, 20V and −5V respectively.

Because the multiplexer 431 is corresponding to the scan line $S_{21}$, the image controlling signal $A_{21}$ is the first driving signal $A_{31}$ for the scan line $S_{21}$. When the first driving signal $A_{31}$ is transmitted to the multiplexer 431, the multiplexer 431 can transmit one of the power signals $A_{61}$ to $A_{64}$ to the scan line $S_{21}$ according to the first driving signal $A_{31}$ to determine the voltage level of the scan signal transmitted by the scan line $S_{21}$. If the scan line $S_{21}$ transmits the voltage level of 30V or 20V, the thin film transistor of the pixel $\mathbf{3}_{11}$ can be turned on. If the scan line $S_{21}$ transmits the voltage level of −10V or −5V, the thin film transistor of the pixel $\mathbf{3}_{11}$ can be turned off.

To be noted, the number of the power signals generated by the power converting unit 42 can not be limited to four as shown in the embodiment (such as the power signals $A_{61}$ to $A_{64}$), but be designed according to requests, and the voltage level of the power signal is unlimited either.

In the embodiment, partial multiplexers 431 are electrically connected with the scan lines $S_{21}$ to $S_{2m}$ and others are electrically connected with the data lines $D_{21}$ to $D_{2n}$. For clear description, the power converting unit 42, the multiplexer 431 and the corresponding data line $D_{21}$ that is electrically connected with the power converting unit 42 and the multiplexer 431 are illustrated as an example to explain the multiplexing unit 43 can transmit one of the power signal to the data line $D_{21}$ according to the image controlling signal $A_{21}$.

Figure 6:
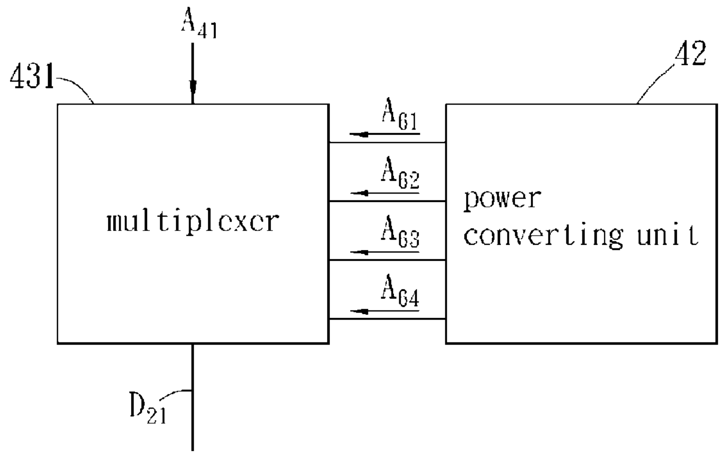

As shown in FIG. 6, the power converting unit 42 can output four power signals $A_{61}$ to $A_{64}$ to the multiplexer 431. The power signals $A_{61}$ to $A_{64}$ can be DC voltage signals, such as 30V, −10V, 20V and −5V respectively.

Because the multiplexer 431 is corresponding to the data line $D_{21}$, the image controlling signal $A_{21}$ input to the multiplexer 431 is the second driving signal $A_{41}$ for the data line $D_{21}$. When the second driving signal $A_{41}$ is transmitted to the multiplexer 431, the multiplexer 431 can transmit one of the power signals $A_{61}$ to $A_{64}$ to the data line $D_{21}$ according to the second driving signal $A_{41}$ to determine the voltage level of the image signal transmitted by the data line $D_{21}$. If the thin film transistor of the pixel $\mathbf{3}_{11}$ turns on, the image signal transmitted by the data line $D_{21}$ can be applied to the pixel $\mathbf{3}_{11}$ so that the gray level of the image to display can be controlled by the voltage level (30V, −10V, 20V or −5V) of the image signal.

Figure 7:
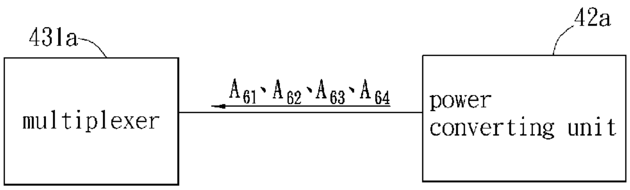
Figure 8:
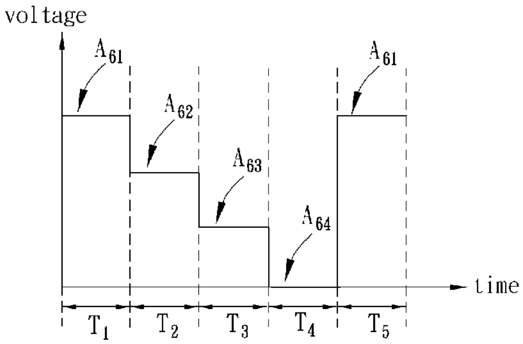
FIG. 8 is a schematic diagram of the power signals output by the power converting unit as shown in FIG. 7.

As mentioned above, the power converting unit 42 can transmit the power signals $A_{61}$ to $A_{64}$ to the multiplexer 431 through different output terminals or wires. Alternatively, as shown in FIG. 7, the power signals $A_{61}$ to $A_{64}$ can be transmitted through the same output terminal or wire to the multiplexer 431*a* by the power converting unit 42*a*. In this case, as shown in FIG. 8, the power converting unit 42*a* transmits the power signals $A_{61}$ to $A_{64}$ to the multiplexer 431*a* through the same terminal or wire at different time by time division multiplexing. For example, the power signal $A_{61}$ is output at time $T_1$, the power signal $A_{62}$ is output at time $T_2$, the power signal $A_{63}$ is output at time $T_3$, the power signal $A_{64}$ is output at time $T_4$, and after (including time $T_5$), the power signals $A_{61}$ to $A_{64}$ are sequentially output again. To be noted, the level voltages of the power signals $A_{61}$ to $A_{64}$ are not limited here.

Besides, in manufacturing, at least one portion of the driving circuit 4 can be disposed in an integrated circuit (IC) through a mono-crystalline process for effectively reducing size, or disposed at the same substrate with the pixel units $\mathbf{3}_{11}$ to $\mathbf{3}_{mn}$ through a multi-crystalline process or an amorphous process. The amorphous process can be an amorphous silicon TFT process or an organic TFT process. For example, the driving unit 41 can be disposed in an IC through a mono-crystalline semiconductor process, and the power converting unit 42 and the multiplexing unit 43 can be disposed at the same substrate with the pixel units $\mathbf{3}_{11}$ to $\mathbf{3}_{mn}$ through a multi-crystalline process or an amorphous process. In sum, the driving unit 41, the power converting unit 42 and the multiplexing unit 43 can be integrated in an IC, or the driving unit 41 and the multiplexing unit 43 are integrated in an IC. The IC above can be a mono-crystalline IC.

In summary, the driving circuit of the non-volatile display module and apparatus of the invention has the driving unit, the power converting unit and the multiplexing unit, which can process the signals transmitted by the scan line and the data line to display images. Compared with the prior art, the invention integrates the scan driving circuit and the data driving circuit into the driving circuit that is configured of a simpler frame and used to process the signals transmitted by the scan line and the data line simultaneously. Therefore, the non-volatile display module and apparatus of the invention can decrease the number of driving components to save more room and save the production cost.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A non-volatile display module, comprising:

a display panel having a substrate, wherein at least one scan line, at least one data line and at least one thin film transistor (TFT) are disposed on the substrate, and the TFT is disposed at an intersection area of the scan line and the data line; and an integrated driving circuit having:

only a driving unit receiving at least an image controlling signal according to only a clock signal, wherein the image controlling signal has a plurality of first driving signals and a plurality of second driving signals;

a power converting unit generating a plurality of power signals; and a multiplexing unit directly connected with the scan line, the data line, the driving unit and the power converting unit, respectively;

wherein the multiplexer transmits one of the power signals to the scan line according to one of the first driving signals to determine a voltage level of a scan signal transmitted by the scan line, and the multiplexer transmits one of the power signals to the data line according to one of the second driving signals to determine a voltage level of an image signal transmitted by the data line.

2. The display module as recited in claim 1, wherein the driving unit has:

at least one shift register receiving the image controlling signal according to the clock signal; and at least one latch electrically connected with the shift register and receiving the image controlling signal according to a latch signal.

3. The display module as recited in claim 1, wherein the power converting unit is a DC/DC converting unit.

4. The display module as recited in claim 1, wherein at least one portion of the display module is made through a mono-crystalline process, a multi-crystalline process or an amorphous process.

5. The display module as recited in claim 4, wherein the amorphous process is an amorphous silicon TFT process or an organic TFT process.

6. The display module as recited in claim 1, wherein the driving unit, the power converting unit and the multiplexing unit are configured in an integrated circuit (IC).

7. The display module as recited in claim 1, wherein the driving unit and the multiplexing unit are configured in an integrated circuit (IC).

8. A non-volatile display apparatus, comprising:

a non-volatile display module, comprising:

a display panel having a substrate, wherein at least one scan line, at least one data line and at least one thin film transistor (TFT) are disposed on the substrate, and the TFT is disposed at an intersection area of the scan line and the data line; and an integrated driving circuit having:

only a driving unit receiving at least an image controlling signal according to only a clock signal, wherein the image controlling signal has a plurality of first driving signals and a plurality of second driving signals;

a power converting unit generating a plurality of power signals; and a multiplexing unit, directly connected with the scan line, the data line, the driving unit and the power converting unit, respectively;

wherein the multiplexer transmits one of the power signals to the scan line according to one of the first driving signals to determine a voltage level of a scan signal transmitted by the scan line, and the multiplexer transmits one of the power signals to the data line according to one of the second driving signals to determine a voltage level of an image signal transmitted by the data line.

9. The display apparatus as recited in claim 8, wherein the driving unit has:

at least one shift register, receiving the image controlling signal according to the clock signal; and at least one latch, electrically connected with the shift register and receiving the image controlling signal according to a latch signal.

10. The display apparatus as recited in claim 8, wherein the power converting unit is a DC/DC converting unit.

11. The display apparatus as recited in claim 8, wherein at least one portion of the display module is made by a mono-crystalline process, a multi-crystalline process or an amorphous process.

12. The display apparatus as recited in claim 11, wherein the amorphous process is an amorphous silicon TFT process or an organic TFT process.

13. The display apparatus as recited in claim 8, wherein the driving unit, the power converting unit and the multiplexing unit are configured in an integrated circuit (IC).

14. The display apparatus as recited in claim 8, wherein the driving unit and the multiplexing unit are configured in an integrated circuit (IC).

* * * * *